United States Patent [19]

Biamonte et al.

[11] Patent Number: 5,286,272
[45] Date of Patent: Feb. 15, 1994

[54] WATER SOLUBLE POTASSIUM PHOSPHATE CAKING INHIBITOR FOR FERTILIZER

[76] Inventors: Richard L. Biamonte, 2822 Hamilton Blvd., Allentown, Pa. 18104; Lorraine A. Corvino, 948 W. State St., Coopersburg, Pa. 18036

[21] Appl. No.: 854,197

[22] Filed: Mar. 20, 1992

[51] Int. Cl.$^5$ ............................ C05C 9/00; C05B 7/00
[52] U.S. Cl. ............................................ 71/29; 71/33; 71/64.12; 71/64.13
[58] Field of Search ............... 71/64.12, 64.13, 33, 71/29; 426/652

[56] References Cited

U.S. PATENT DOCUMENTS 2,770,548  11/1956  Hall et al. ........................... 426/652

Primary Examiner—Ferris Lander

[57] ABSTRACT

An inorganic fertilizer composition that flows freely and resists caking comprising at least one beneficial agent and an anti-caking agent in an amount sufficient to reduce the caking tendency of the beneficial agent wherein the anti-caking agent is tripotassium phosphate. In a preferred embodiment, the anti-caking agent is added in amount in the range of 0.25% to 5.0% by weight.

3 Claims, No Drawings

WATER SOLUBLE POTASSIUM PHOSPHATE CAKING INHIBITOR FOR FERTILIZER

BACKGROUND OF THE INVENTION

Chemical inorganic fertilizers such as ammonium phosphates, ammonium nitrates, potassium nitrates, potassium chlorides, potassium sulfates and many others are well known fertilizers. Methods of manufacturing these inorganic fertilizers as well as methods of processing the fertilizers into particles are also well known in the fertilizer art. The resulting fertilizer particles, however, exhibit at least one undesirable characteristic. The caking of various types of fertilizers interferes with the handling of fertilizers in bulk form at the factory and by the end user.

Caking is believed to be caused by several factors, e.g., the formation of crystalline bridges according to which solid connections are formed at the points of contact among the granules. Alternatively, there may be capillary adhesion or bonding between the granules with a significant force often being necessary to break this adhesion or bonding. The cohesive forces will vary depending upon the storage conditions and other variables. The hygroscopic nature of the fertilizers also results in undesirable caking. In all cases however, the caking causes a serious problem to which a completely satisfactory solution is lacking.

Several prior art methods have been proposed to decrease fertilizer caking which involve the use of additives to the fertilizer composition. Typical additives include the use of finely divided powders which must cover the fertilizer substantially uniformly such as for example talc, kaolin and diatomaceous earth. Surfactants may also be used, e.g., non-ionic surfactants, such as polyoxylenes and anionic surfactants, e.g., alkyl-aryl-sulfonates and in particular the sulfonates derived from benzene and naphthalene. Cationic surfactants have also been used, especially the amines derived from long chain fatty acids. These additives form a hydrophobic film around the fertilizer granules and simultaneously reduce the surface tension of the intergranular solution, lower the angle of contact and thereby exert a beneficial effect on the caking problem. Further additives include compounds that also tend to form a hydrophobic film around the fertilizer granules such as paraffin wax, polyolefin wax and mineral oils. However, it has been found that the compositions used heretofore are not entirely effective in eliminating the caking problem. Moreover, many of these additives are not desirable in the fertilizer composition, others are expensive and require relatively large amounts thereof.

Various types of anti-caking additives include those disclosed in the following references.

U.S. Pat. Nos. 5,041,153, 5,032,164 and 4,846,871 disclose the use of lignosulfonate to treat inorganic chemical fertilizers to harden the particles to provide anti-caking and anti-dusting properties by adding up to about 5.0% by weight of lignosulfonate to the fertilizer.

U.S. Pat. No. 4,772,308 discloses an anti-caking composition for nitrogen-containing material consisting essentially of ammonium salts useful as an ingredient of fertilizer, e.g., sodium alkyl sulfates, potassium alkyl sulfates or monoethanolammonium alkyl sulfate, diethanolammonium alkyl sulfate and triethanolammonium alkyl sulfate.

Heretofore, the use of tripotassium phosphate as an anti-caking agent for fertilizers has not been achieved, although tripotassium phosphate has been used for other purposes, as set forth in the following exemplary references.

U.S. Pat. No. 3,791,809 discloses a method of strengthening glass articles using powdered salts as the ion exchange medium, e.g., tripotassium phosphate, and utilizes cornstarch and flocculent silica as anti-caking agents.

U.S. Pat. No. 3,609,089 discloses the use of tripotassium phosphate as an alkaline builder in a process and composition for cleaning road vehicles, while silicate, silica gel and similar materials provide a non-caking function.

U.S. Pat. No. 4,066,390 discloses the use of tripotassium phosphate as a pH buffer.

Therefore, a need exists for an anti-caking agent to be used in inorganic fertilizers.

OBJECTS OF THE INVENTION

Accordingly, it is a general object of this invention to provide an anti-caking agent for use in fertilizers which overcomes the disadvantages of the prior art.

It is a further object of this invention to provide an anti-caking composition which includes an inorganic fertilizer.

It is a still further object of the present invention to provide an anti-caking composition which utilizes a relatively inexpensive additive in relatively small amounts and which is easy and economical to use on a commercial scale.

It is yet still another object of the present invention to provide an additive which enhances the dryness of the fertilizer, reduces the volume thereof and enhances the flowability of the fertilizer.

It is another object of the present invention to provide an additive which makes any colorant present in the fertilizer less intense.

It is a further object of the present invention to provide a beneficial anti-caking agent which contributes water soluble phosphorus and potassium to the admixture, without the addition of a non-nutrient component.

SUMMARY OF THE INVENTION

These and other objects of this invention are achieved by providing an inorganic fertilizer composition that flows freely and resists caking comprising at least one beneficial agent and an anti-caking agent in an amount sufficient to reduce the caking tendency of the beneficial agent wherein the anti-caking agent is tripotassium phosphate. In a preferred embodiment, the anti-caking agent is added in amount in the range of 0.25% to 5.0% by weight.

DETAILED DESCRIPTION OF THE PREFERRED EMBODIMENT

The composition of the present invention is easily prepared by admixing the anti-caking agent with the other materials which comprise the fertilizer. Any method of admixing the materials may be readily utilized as long as the desired admixture is obtained. For example, one can simply introduce the additive in the desired amount into a conventional blender with the other nutrient sources and mixed. Alternatively, one can utilize a vibrator or rotating drum which agitates the mixture.

Tripotassium phosphate ($K_3PO_4$) is readily available and is added to a fertilizer, such as a water soluble fertilizer, whose components, termed a beneficial agent, may include ammonium nitrate, monoammonium phosphate, diammonium phosphate, urea phosphate, monopotassium phosphate, potassium nitrate, potassium chloride, potassium sulfate, ammonium sulfate, urea, calcium nitrate, magnesium sulfate, magnesium nitrate, boric acid, copper EDTA (ethylenediaminetetraacetic acid), copper sulfate, iron DTPA, iron EDTA, manganese EDTA, manganese sulfate, sodium molybdate, ammonium molybdate and zinc sulfate, or any other suitable beneficial or desirable agent.

The anti-caking additive of the present invention is used in small amounts and has been found to be particularly effective in such small amounts in reducing the caking behavior of the base composition. Moreover, the conditions of mixture are not particularly critical as long as an intimate additive mixture is obtained. Depending upon the circumstances of use, one can add the potassium phosphate with blends of the nutrient sources listed above, or other suitable nutrients, in the range of 0.25% to 5.0% by weight of the fertilizer. Two examples of the types of mixtures which may be obtained with the present invention include those set forth below.

EXAMPLE I

| 20-10-20 Fertilizer | |
|---|---|
| Component | % by weight |
| ammonium nitrate | 55.7 |
| monoammonium phosphate | 16.7 |
| potassium nitrate | 45.1 |
| magnesium sulfate | 1.0 |
| trace elements | 1.0 |
| tripotassium phosphate | 0.5 |
| | 100.0 |

EXAMPLE I

| 20-20-20 Fertilizer | |
|---|---|
| Component | % by weight |
| urea | 21.7 |
| monoammonium phosphate | 32.0 |
| potassium nitrate | 44.3 |
| magnesium sulfate | 0.5 |
| trace elements | 1.0 |
| tripotassium phosphate | 0.5 |
| | 100.0 |

The use of the anti-caking agent of the present invention is also very advantageous because the components thereof, i.e., potassium and phosphate, are both major plant requiring nutrients. There are therefore no extraneous components or non-nutrient components added to the fertilizer.

Without further elaboration the foregoing will so fully illustrate our invention that others may, by applying current or future knowledge, adapted the same for use under various conditions of service.

We claim:

1. An inorganic fertilizer composition that flows freely and resists caking consisting essentially of at least one beneficial agent and an anti-caking agent in an amount in the range of 0.25% to 5.0% by weight to reduce the caking tendency of the beneficial agent wherein the anti-caking agent is tripotassium phosphate, said beneficial agent being selected from the group consisting of ammonium nitrate, monoammonium phosphate, diammonium phosphate, urea phosphate, monopotassium phosphate, potassium nitrate, potassium chloride, potassium sulfate, ammonium sulfate, urea, calcium nitrate, magnesium sulfate, magnesium nitrate, boric acid, copper EDTA (ethylenediaminetetraacetic acid), copper sulfate, iron DTPA, iron EDTA, manganese EDTA, manganese sulfate, sodium molybdate, ammonium molybdate and zinc sulfate.

2. A method of using tripotassium phosphate to prevent an inorganic fertilizer from absorbing moisture by adding the tripotassium phosphate in an amount in the range of 0.25% to 5.0% by weight to a beneficial agent selected from the group consisting of ammonium nitrate, monoammonium phosphate, diammonium phosphate, urea phosphate, monopotassium phosphate, potassium nitrate, potassium chloride, potassium sulfate, ammonium sulfate, urea, calcium nitrate, magnesium sulfate, magnesium nitrate, boric acid, copper EDTA (ethylenediaminetetraacetic acid), copper sulfate, iron DTPA, iron EDTA, manganese EDTA, manganese sulfate, sodium molybdate, ammonium molybdate and zinc sulfate.

3. A method of treating a fertilizer to improve said fertilizer's anti-caking and flowability properties, consisting essentially of the steps of:

preparing an admixture of from 0.25% to 5.0% by weight of tripotassium phosphate and a fertilizer selected from the group consisting of ammonium nitrate, monoammonium phosphate, diammonium phosphate, urea phosphate, monopotassium phosphate, potassium nitrate, potassium chloride, potassium sulfate, ammonium sulfate, urea, calcium nitrate, magnesium sulfate, magnesium nitrate, boric acid, copper EDTA (ethylenediaminetetraacetic acid), copper sulfate, iron DTPA, iron EDTA, manganese EDTA, manganese sulfate, sodium molybdate, ammonium molybdate and zinc sulfate; and processing the admixture into a particulate form.

* * * * *